the overall operating efficiency of a gas turbine system by purifying relatively hot turbine exhaust gas to remove environmentally harmful components therefrom, by converting a portion of the thermal energy of the exhaust gas to mechanical work and by reclaiming a portion of the thermal energy of the exhaust gas by transferring it to other fluids. Purification to remove harmful components is advantageously accomplished using regenerators. Conversion of thermal energy to mechanical work is usefully accomplished in a primary turbine motivated by hot combustion gas and in a helper turbine motivated by a relatively hot heat exchange fluid which has derived its thermal energy by exchange with heated solids in thermodynamically efficient regenerators.

United States Patent [19]

Funk

[11] 4,406,118
[45] Sep. 27, 1983

[54] SYSTEM FOR TREATING AND RECOVERING ENERGY FROM EXHAUST GASES

[76] Inventor: Harald F. Funk, 68 Elm St., Murray Hill, N.J. 07974

[21] Appl. No.: 298,364

[22] Filed: Sep. 1, 1981

Related U.S. Application Data

[63] Continuation-in-part of Ser. No. 205,348, Nov. 10, 1980, which is a continuation-in-part of Ser. No. 962,103, Nov. 17, 1978, Pat. No. 4,265,088, which is a continuation-in-part of Ser. No. 674,219, Apr. 6, 1976, Pat. No. 4,126,000, which is a continuation-in-part of Ser. No. 565,045, Apr. 4, 1975, Pat. No. 3,970,524, which is a continuation-in-part of Ser. No. 486,562, Jul. 8, 1974, abandoned, which is a continuation-in-part of Ser. No. 252,610, May 12, 1972, abandoned.

[51] Int. Cl.³ .......................... F02C 3/04; F01K 23/08
[52] U.S. Cl. .................................. 60/39.183; 60/655; 60/659
[58] Field of Search ................ 60/39.182, 39.183, 659, 60/655

[56] References Cited

U.S. PATENT DOCUMENTS 3,871,172  3/1975  Villiers-Fisher et al. .......... 60/39.02

*Primary Examiner*—Allen M. Ostrager
*Attorney, Agent, or Firm*—Sixbey, Friedman & Leedom

[57] ABSTRACT

A method and apparatus for improving the overall operating efficiency of a gas turbine system by purifying relatively hot turbine exhaust gas to remove environmentally harmful components therefrom, by converting a portion of the thermal energy of the exhaust gas to mechanical work and by reclaiming a portion of the thermal energy of the exhaust gas by transferring it to other fluids. Purification to remove harmful components is advantageously accomplished using regenerators. Conversion of thermal energy to mechanical work is usefully accomplished in a primary turbine motivated by hot combustion gas and in a helper turbine motivated by a relatively hot heat exchange fluid which has derived its thermal energy by exchange with heated solids in thermodynamically efficient regenerators.

24 Claims, 5 Drawing Figures

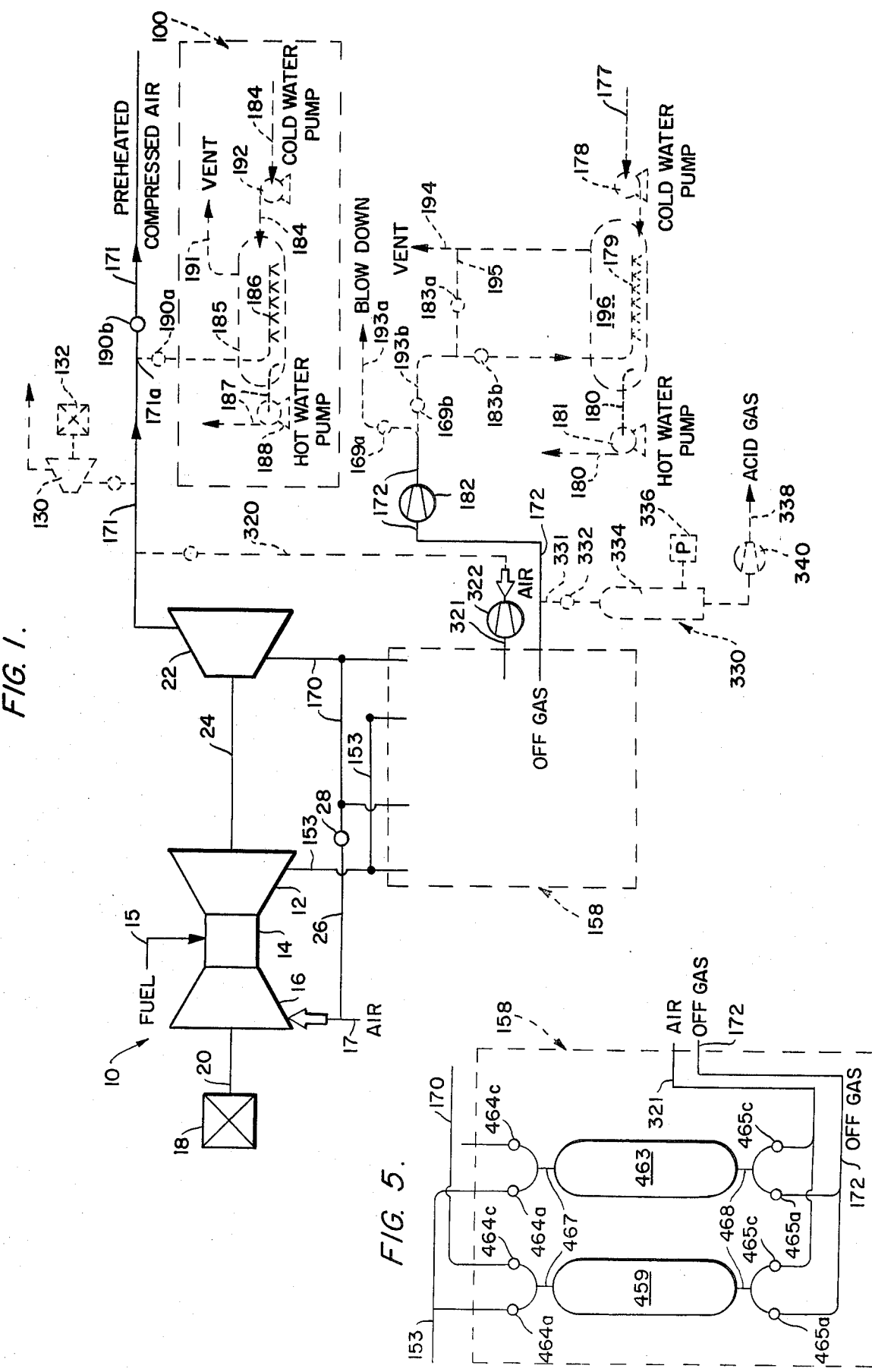

SYSTEM FOR TREATING AND RECOVERING ENERGY FROM EXHAUST GASES

CROSS REFERENCE TO RELATED APPLICATIONS

The present application is a continuation-in-part of application Ser. No. 205,348, filed Nov. 10, 1980, which application was a continuation-in-part of application Ser. No. 962,103, filed Nov. 17, 1978, (now U.S. Pat. No. 4,265,088), which application was a continuation-in-part of application Ser. No. 674,219 filed Apr. 6, 1976 (now U.S. Pat. No. 4,126,000), which application was a continuation-in-part of application Ser. No. 565,045, filed Apr. 4, 1975 (now U.S. Pat. No. 3,970,524), which application was a continuation-in-part of application Ser. No. 486,562, filed July 8, 1974 (now abandoned), which application, in turn, was a continuation-in-part of application Ser. No. 252,610, filed May 12, 1972 (now abandoned), the disclosures of which are incorporated by reference.

BACKGROUND OF THE INVENTION

1. Field of the Invention

The present invention relates generally to gas turbine engine systems, and more particularly, to methods and apparatus for treating and recovering energy from hot gases, such as primary gas turbine exhaust gases, to improve the overall efficiency of the gas turbine engine, heating or power generating system in which the gases are employed.

2. Prior Art

The use of high pressure gas turbine engines motivated by combustion product gases to provide mechanical shaft energy, which is convertible into electrical energy, is common in modern day power plants. In recent years, due in part to increasing fuel costs, there has been an especially intensive effort by designers to increase the thermodynamic efficiency of the gas turbine. It is generally accepted that the efficiency of such a turbine is a function of the turbine operating temperature ($T_o$) and turbine exhaust gas temperature ($T_x$) and that the efficiency relationship may be expressed as:

$$\text{efficiency} = (T_o - T_x)/T_o$$

Thus, in a typical situation, where $T_o = 1,073°$ K. and $T_1 = 773°$ K., the turbine efficiency is only 27.8%. Most efforts to improve turbine efficiency have focused on increasing $T_o$, the turbine operating temperature. However, increased temperatures necessitate the use of improved materials, which are generally more costly, while the exposure to higher temperatures shortens the lifetime of the equipment. Thus, on an overall economic basis, it is doubtful that merely increasing $T_o$ is a productive approach to improving turbine efficiency.

Designers have had very little success in lowering $T_x$, the turbine exhaust gas temperature. As a result, the relatively low pressure, relatively high thermal content turbine exhaust gases are typically used as the thermal source in conventional heat exchangers and passed in indirect heat exchange relationship with water or compressed air to produce steam or combustion chamber feed air before being disposed of by exhausting them to atmosphere through tall chimneys or stacks. It has also been suggested that overall turbine system efficiency could be increased by conducting the relatively high thermal content exhaust gases to a low pressure turbine to produce additional mechanical shaft work before passing the resulting exhaust gas, in typical manner, through conventional heat exchangers to indirectly heat water or compressed air before discharging the gases to atmosphere through tall chimneys or stacks.

The problem with either of the foregoing approaches to utilizing the exhaust gases is that they typically contain harmful contaminants yet must be discharged through stacks to the atmosphere. The disadvantages of this method of disposal include resulting air pollution and its harmful effects on the environment, a waste of recoverable heat energy, and the high cost of constructing and maintaining tall stacks. Loss of recoverable heat energy is unavoidable because gases discharged into a stack must be substantially hotter than ambient air to produce an up-draft in the stack and to avoid condensation in the chimney. Moreover, the latent heat of steam in flue gases is not generally recovered in order to avoid condensation and the attendant corrosion, as a result of which additional, available heat energy is being wasted.

Where the latent heat of steam is not recovered, the system designer must work with "low heating values" of the fuels rather than "high heating values". Low and high heating values for fuels are given in such handbooks as the John N. Perry *Engineering Manual*, published in 1959 by McGraw Hill, where the following typical heating values are given:

| Gas | High Heating Value | Low Heating Value |
|---|---|---|
| Hydrogen | 60,958 Btu/lb | 51,571 Btu/lb |
| Methane | 23,861 Btu/lb | 21,502 Btu/lb |
| Octane | 20,510 Btu/lb | 19,150 Btu/lb |
| Methyl alcohol (vapor) | 10,270 Btu/lb | 9,080 Btu/lb |

As will be apparent from these heating values, about 18 percent more Btu/lb can be recovered from hydrogen if its high heating value can be utilized, about 11 percent more from methane, about 13 percent more from methyl alcohol vapor and about 7 percent more from octane "gasoline". Prior systems have not been able to utilize the high heating value of such gases.

As the public concern about air pollution has increased, stack heights have been increased to affect better dispersion of pollutants. However, increasing stack heights adds to the cost of constructing and maintaining stacks, yet provides no solution to the underlying problem, i.e., avoiding emission in the first instance of harmful substances such as sulfur oxides, chlorine gases, phosphor oxides, etc.

A significant factor in air pollution is the increasing level of gaseous airborne pollutants which combine with moisture in the air to produce acids, e.g., carbon dioxide, sulfur dioxide, and compounds of chlorine and fluorine. The carbon dioxide content is some industrial districts is as high as ten times normal. Acid forming pollutants have been found in some instances to increase the acidity of rainwater from its normal pH of about 6.9 to values of 4.0. Rainwater having a pH of 5.5 or lower less will destroy aquatic life and can do substantial harm to buildings, monuments, and other structures.

One proposal for removing acid forming components from exhaust gases is to scrub the entire flow of exhaust gases with water and caustic prior to discharging them through a stack. However, scrubbing the entire exhaust gas flow requires large quantities of water, which are not always available, and requires costly, large capacity scrubbing equipment. Indeed, scrubbing the entire flow of exhaust gases from some incinerators requires at least half the amount of water, by weight, of the solid wastes burned in the incinerator. Treating the large volume of scrub water needed in such a process is very costly and contributes to the impracticality of scrubbing as a total solution to the acid pollutant problem.

Another difficult pollutant to deal with effectively is sulfur in the exhaust gases. One proposal for the desulfurization of exhaust gas utilizes a series of heat exchangers to extract heat energy from the gas prior to a scrubbing operation. Heat extracted from the gas is returned to the gas following desulfurization and the gas is exhausted through a tall stack for diffusion into the atmosphere. This proposal has the disadvantages of wasting heat energy recovered from the gases, requiring large volumes of scrubbing water, requiring the use of a tall stack, and polluting the air with such noxious components as are not removed during scrubbing.

The problem of disposing of exhaust gases is now recognized as a major concern in industrial countries throughout the world. Dispersing emissions through the use of tall stacks is no longer regarded as an acceptable solution. Applicant's U.S. Pat. No. 3,970,524 discloses a system for gasification of solid waste materials and a method for treating the resulting gases to produce commercially useable gases in such a manner that dispersion through stacks is not necessary. A feature of one embodiment of this patent is pressurization of a combustion zone to such pressures as will permit blower and/or compression units to be eliminated from the gas treatment system. Another feature is the use of a multichamber gas treatment unit in which noxious gas components are sublimed or "frozen out" and thereby separated from the clean useable gas components. A problem not addressed by U.S. Pat. No. 3,970,524 is that of providing a system for treating combustion exhaust gases and productively reclaiming heat energy from the hot gases. This problem is, however, dealt with in applicant's U.S. Pat. No. 4,126,000 which teaches reclamation of heat energy by the transfer of the sensible and latent heat of the gases to a power fluid in indirect heat exchange relationship therewith, as in a conventional heat exchanger. However, the economics of indirect heat exchange at the lower temperature levels are very poor and reduce the overall desirability of such a system. Applicant's U.S. Pat. No. 4,265,088 (copending Application Ser. No. 962,103, filed Nov. 17, 1978,) discloses a system which utilizes direct heat exchange between the hot gases and a power fluid to improve the economics and thermal efficiency of the system.

SUMMARY OF THE INVENTION

It is therefore an object of the present invention to overcome the foregoing economic and other drawbacks of the prior art, and to provide unique and improved methods and apparatus for improving the overall operating efficiency of a gas turbine system by purifying relatively hot turbine exhaust gases to remove harmful components therefrom, by converting a portion of the thermal energy of the exhaust gases to mechanical work and by transferring a portion of the thermal energy of the exhaust gases to other fluids.

Another object of the invention is to provide unique and improved methods and apparatus for converting a portion of the thermal energy of the relatively hot exhaust gases to mechanical work by expanding relatively hot compressed air in a helper turbine.

Still another object of the invention is to provide improved systems and methods for treating relatively hot turbine exhaust gases for economically removing harmful components and recovering heat energy therefrom to permit their discharge to atmosphere without the need for expensive gas treatment equipment or tall chimneys or stacks.

Other objects and advantages will become apparent from the following description and appended claims.

In accordance with the foregoing objects the present invention provides a method for improving the overall efficiency of a gas turbine power plant system whereby relatively hot turbine exhaust gases, generally at about 300° to 600° C., containing such components as nitrogen, carbon dioxide, carbon monoxide, sulfur dioxide, hydrocarbon gases, and the like, are treated by cooling in regenerators in heat-exchange relationship with solid materials having relatively high heat capacitance and relatively large surface area to volume ratios, processing to remove the noxious, generally less volatile components of the exhaust gases, and exhausting the resulting purified gases (generally comprising the more volatile components of the exhaust gas) to atmosphere without using a tall stack. The less volatile components, comprising the environmental pollutants, may be removed in known manner, preferably by subliming or "freezing out" such harmful, less volatile components of the gases for subsequent scrubbing, neutralization or utilization. Heat values in the relatively hot turbine exhaust gases are removed, at least in part, by cooling the gas in regenerators and recovered by passing a heat exchange fluid, preferably a gas such as steam, compressed air, or the like, through the regenerators. The resulting heated heat exchange fluid is utilized to operate at least one auxiliary or helper gas turbine, with the result that the overall thermodynamic efficiency of the gas turbines comprising the power plant system is improved. If compressed air is used as the heat exchange fluid, at least a portion of the heated air may advantageously be used as the combustion air fed to the exhaust gas source, i.e., the gas turbine combustion chamber or the combustion unit. The heat values remaining in the purified exhaust gas, if sufficient, may also be utilized, e.g., to heat water (or other fluid) which, in turn, may be used for generating steam, preheating boiler feed water, domestic heating or other purposes. Likewise, the heat values remaining in the auxiliary or helper turbine exhaust may be utilized to heat water or other fluid.

In one embodiment of the invention the relatively hot turbine exhaust gases are purified in regenerators, i.e., less volatile components are sublimed or condensed. The gases are cooled prior to subliming using regenerators as heat exchangers and transfer their heat to the packing of the regenerators. The cooled and purified gas may be used to reclaim a portion of the heat originally transferred to the regenerators. The balance of the heat energy transferred from the gases is recovered from the regenerators by passing a heat exchange fluid, such as compressed air, therethrough. In a particularly desirable form of this embodiment a first plurality of regenerators arranged in series are used to perform the cooling and gas purifying functions and a second plurality of regenerators arranged in series are used to perform the purified gas reheating and heat reclamation functions.

One noteworthy advantage of the various purification systems of the present invention is that they are able to process relatively hot turbine exhaust gases, i.e., gases having a temperature of 300° C. or higher, to convert the gases to a form suitable for venting while at the same time preserving the thermal values present in the gases. Heat reclamation is effected in regenerators which operate at a thermal efficiency of 90% or better compared with conventional indirect heat exchangers which operate at thermal efficiencies in or below the 50-60% range. Another important advantage is that the present systems also obviate the need for costly tall stacks. Still another advantage of the present invention is that the systems consume none or only a small fraction of their power output. Yet another advantage is that the systems of the present invention may, if desired, utilize a sublimation of "freezing out" process to separate out harmful, less volatile gas components which can then be recovered and treated for utilization or neutralized, as by scrubbing, with far less water than would be required if the entire flow of exhaust gases were to be scrubbed as in prior proposals. The small volume of scrub water required for this operation can be treated at minimal cost with scrubbing equipment having a much smaller capacity than is required where the entire flow of exhaust gas is scrubbed. Substantial savings are achieved over prior processes inasmuch as large capacity scrubbing equipment is not required. The ability to utilize smaller capacity equipment is important also from the standpoint of minimizing the amount of expensive corrosion resistant material needed. As is well known, all scrubbing systems experience a severe corrosion problem requiring the provision of expensive corrosion resistant materials. In the present systems, where small scale rather than large scale equipment can be used due to the limited scrubbing voluem, the amount of expensive corrosion resistant material needed is minimized. If the exhaust gases are to be treated for utilization, an absorption or adsorption system can be applied which will yield a concentrated stream of $SO_2$ ready for use in the chemical process industry. Such utilization obviates the use of water for scrubbing in a neutralization system.

Gas treatment methods and apparatus of the type described in U.S. Pat. No. 3,970,524 may advantageously be used to effect a separation of harmful, less volatile exhaust gas components by the sublimation of "freezing out" process. The apparatus includes an arrangement of valve interconnected, packed, refrigerated towers through which exhaust gas passes to effect sublimation or "freezing out" of harmful illustrative components. Components which can be removed by this process include $CO_2$, $HCl$, $H_2S$, $SO_2$, $C_2H_2$, $HCN$, $SO_3$, and the like. It is noteworthy that this type gas treatment process is primarily of a physical nature. Chemical treatment is not utilized until noxious gas components, which comprise only a small fraction of the total gas flow, are separated out.

Inasmuch as the system of the present invention provides a relatively simple and inexpensive method of purifying turbine exhaust gases, it also permits the use of cheap fuels having a relatively high sulfur content. The savings which result from the use of cheaper fuels, the elimination of tall stacks, the ability to recover thermal energy from the gases, and convert it to mechanical energy, the elimination of large uses of scrub water, and the reduction in size of required scrubbing equipment make the system economically attractive for installations of a wide range of sizes. Moreover, where the exhaust gases being treated contain a relatively high concentration of sulfurous compounds, elemental sulfur and/or sulfuric acid may be obtained from the compounds, thereby adding to the economy of operation of the system.

BRIEF DESCRIPTION OF THE DRAWINGS

A fuller understanding of the invention may be had by referring to the following description and claims taken in conjunction with the accompanying drawings in which:

FIG. 1 is a schematic flow diagram of a system for practicing one embodiment of the present invention;

FIG. 5 is a schematic flow diagram of an illustrative turbine exhaust gas heat reclamation unit for use in the FIG. 1 embodiment of the present invention.

DESCRIPTION OF THE PREFERRED EMBODIMENTS

Figure 3:
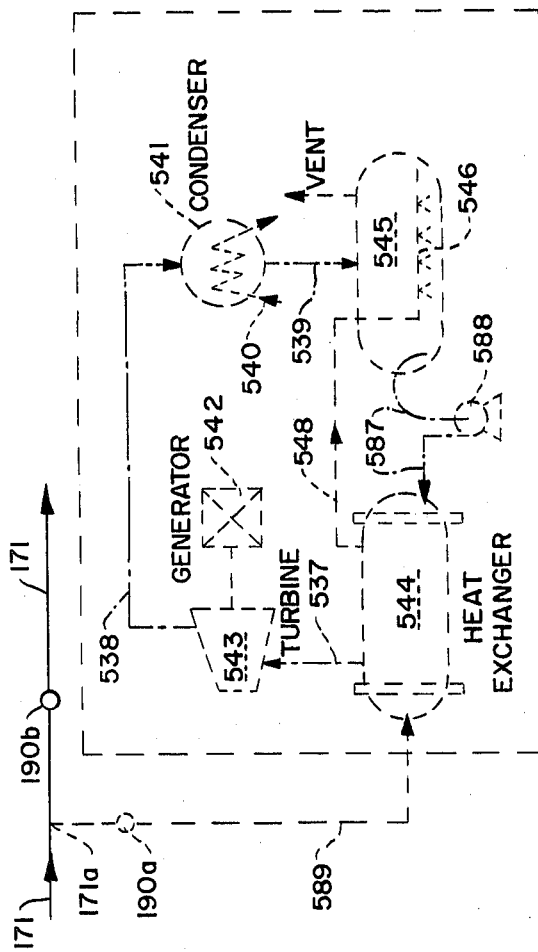
FIG. 3 is a schematic flow diagram of an illustrative helper turbine exhaust gas heat reclamation unit for use in the FIG. 1 embodiment of the present invention.

Referring to FIG. 1, a gas turbine power plant is indicated generally by the numeral 10. The power plant 10 can include one or more gas turbines for the production of shaft work which are motivated by hot exhaust gases emitting from a fuel combustor associated with or separate from the gas turbine. The hot exhaust gases typically contain such components as nitrogen, carbon dioxide, sulfur dioxide, hydrogen sulfide, carbon monoxide, nitrogen oxides, and hydrocarbon components.

In the embodiment illustrated in FIG. 1, the gas turbine power plant 10 comprises a primary or higher pressure turbine 12 having associated therewith a combustion chamber 14 and a compressor 16. Fuel is supplied to the combustion chamber 14 as indicated by arrow 15. In preferred operation the fuel used is inexpensive liquid fuel having a relatively high sulfur content. This fuel is preferred due to its low cost and because the sulfur content is easily separated out of the exhaust gases, as will be explained more fully hereinafter. Air or oxygen enriched air is supplied to the combustion chamber 14 for reaction with the fuel. In preferred practice, a compressor 16 is used to pressurize the air supply furnished via air line 17 such that the combustion chamber operates under pressure. Where available, heated air may be supplied to combustion chamber 12 via air line 17. In a preferred form of the invention, the combustion chamber 12 is operated under sufficient pressure that the exhaust combustion gases can efficiently operate high pressure turbine 12 yet still have sufficient head to pass through the exhaust gas separation and heat reclamation unit. If the pressure of exhaust gas is not sufficient to pass it through the separation and reclamation unit a blower is incorporated into the system design.

Exhaust gases generated in the combustion chamber 14 are ducted through high pressure turbine 12 wherein they are expanded to a lower, substantially ambient, pressure and, in expanding, produce a net shaft work output. To convert the shaft work to a more useful form of energy, a power generator 18 is coupled to the drive shaft 20 of turbine 12. Generally, compressor 16 may likewise be coupled to drive shaft 20 to provide the energy for operation of the compressor. The gases exiting high pressure turbine 12 are led into gas feeder conduit 153 which directs the gases to gas separation and heat reclamation unit 158. These gases have a reduced pressure compared to the combustion chamber exhaust gases, due to pressure losses in turbine 12, but are "relatively hot", at temeratures of about 400°–600° C., and still contain a great deal of thermal energy. The unit 158 is operable: (1) to cool the relatively hot gases and separate them into condensable components of relatively low volatility and more volatile components having similar vapor pressures, such as $C_3$ and $C_4$ fractions; and (2) to reheat the more volatile components and to heat a heat exchange fluid, such as compressed air, to a temperature which may be as high as within a few degrees of the temperature of the relatively hot exhaust gases which entered unit 158 through feeder conduit 153. The more volatile, noncondensed or clean components of the gas exit unit 158 via purified gas (off gas) discharge conduit 172. The heated heat exchange fluid exits unit 158 via heated air discharge conduit 170 and is used to operate low pressure helper or auxiliary gas turbine 22, which may be coupled via drive shafts 24 and 20 to power generator 18, to improve the overall thermodynamic efficiency of the gas turbine power plant system. Although one auxiliary or helper gas turbine is shown, a plurality of such turbines arranged in series or parallel could, if desired, be employed. It will be appreciated that if helper turbine 22 is motivated by a flow of 5–6 bar compressed air at about 760° K. and expands the air, at substantially constant entropy, to about 1 bar and 500° K., an enthalpy change from about 800 kJ/kg to 500 kJ/kg is realized, which enthalpy change is recoverable as subtantial shaft work. The ambient pressure, but still hot at 500° K. air exits helper turbine 22 via heated air discharge conduit 171. As will become clear, this stream of hot air can be charged to a gas turbine and to enhance the turbine's thermal efficiency or directed to the combustion chamber of a boiler.

Figure 2:
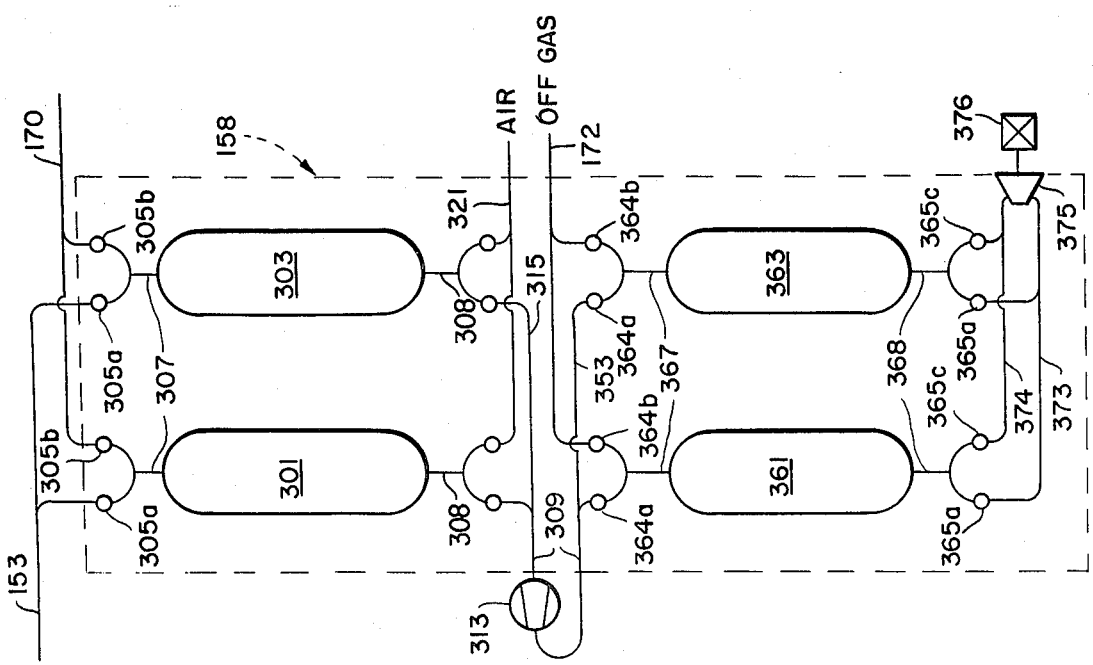
FIG. 2 is a schematic flow diagram of an illustrative turbine exhaust gas separation and heat reclamation unit for use in the FIG. 1 embodiment of the present invention.

Referring to FIG. 2 there is shown an illustrative gas separation and heat reclamation unit 158, useful, for example, in the embodiment of FIG. 1. The unit of FIG. 2 uses separate regenerators to perform the four essential functions of unit 158, i.e., to cool the relatively hot exhaust gas, to separate components of the gas, to reheat the relatively cool purified off gas prior to venting or utilizing, and to reclaim thermal energy transferred from hot exhaust gas to the regenerator packing by heating the compressed air heat transfer fluid. Unit 158 of FIG. 2 accomplishes its functions with a first heat exchange zone comprising a plurality (two are illustrated) of series arranged regenerator units 301, 361 to cool the relatively hot exhaust gas and separate it into its components and a second heat exchange zone comprising a plurality (two are illustrated) of series arranged regenerator units 303, 363 to reheat the relatively cool purified off gas and to reclaim thermal energy by heating a heat transfer fluid. Either set of series arranged regenerator units 301, 361 or 303, 363 can serve as the first heat exchange zone and perform the functions of that zone. Likewise, either set can serve as the second heat exchange zone and perform the functions of that zone. Thus, regenerators 301, 303, comprising a first heat exchange sub-zone, are arranged in parallel relationship to allow the relatively hot exhaust gas to be introduced initially into either one of regenerators 301, 303 and to allow either one to perform the hot exhaust gas cooling function while the other performs the heat reclamation function. Likewise, regenerators 361, 363, comprising a second heat exchange sub-zone, are arranged in parallel relationship to allow either one to perform the component separation function while the other performs the off gas reheating function.

Relatively hot exhaust gases from primary turbine 12 are led into gas feeder conduit 153 from which they pass into exhaust gas separation and heat reclamation unit 158. Unit 158 includes at least four similar packed towers or columns 301, 303, 361, 363. Towers 301 and 303 are arranged in parallel relationship to each other, as are towers 361, and 363. However, towers 301, 303 are arranged in series relationship to towers 361, 363. Each of the towers 301, 303, 361, 363 is similar in construction and content to the regenerators shown as 59, 61, 63 in FIG. 1 of U.S. Pat. No. 4,126,000 and each is similar to a regenerator described by Russell B. Scott at pages 29–31 of *Cryogenic Engineering*, published in 1959 by D. Van Nostrand Co., Princeton, N.J. Each of the towers contains loose solids, for example, ceramic balls, quartzite pebbles, steel shot, etc., pancakes wound from thin corrugated aluminum ribbon, or other solids having relatively large surface area to volume ratios, relatively high heat capacitances and the capability of storing heat and resisting corrosion. Typically, the packing for the regenerator towers has a surface area to volume ratio and packing capability sufficient that the regenerator has a surface density of 1000 to 2000 square ft. per cubic foot.

Automatic switch valves 305a, 305b are provided at the end of towers 301, 303 adjacent to feeder conduit 153 with valves 305a connecting thereto. Tower connection conduits 307 communicate the towers 301, 303 with the valves 305a, 305b. Tower connection conduit 309 through cross conduit 315 communicates with tower connection conduits 308 and connects towers 301, 303 with feed conduit 353 and automatic switch valves 364a, 364b provided at the end of towers 361, 363 adjacent feed conduit 353. Tower connection conduit 367 communicates with towers 361, 363 with the valves 364a, 364b. Tower connection conduit 368 communicates the towers 361, 363 with automatic switch valves 365a, 365c. A pair of transfer conduits 373, 374 connect valves 365a, 365c of towers 361, 363 with a cooling means, preferably an expansion turbine 375. An expansion turbine has the advantage that it cools the gas more efficiently by substantially isentropic expansion while at the same time it produces useful shaft work. A power generator 376 may be coupled to turbine 375 to convert the shaft work to a more useful form of energy. In an alternative embodiment (not shown), transfer conduits 373,374 could connect the valves 365a, 365c with a noxious gas removal system, such as a system which removes environmental pollutants by use of conventional absorption, extraction and/or adsorption means and which operates at relatively low temperatures, e.g., about 5° to −50° C. In the illustrated system, purified off gas is discharged following component separation in tower 361 and reheating in tower 363 through purified off gas discharge conduit 172. A preheated compressed air discharge conduit 170 connects with the valves 305b. A compressed air feed line 321 having a compressor 322 therein supplies a cooling heat exchange fluid to towers 301, 303. A compressor 313 is included in tower connection conduit 309 to provide the positive pressure in the system which may be required when very large exhaust gas volumes are passed.

The manner by which gases are treated in unit 158 may be visualized as that of subjecting the gases in successive like cycles to cooling in towers 301, 303 and reheating and/or cooling in towers 361, 363. During each cycle, a different step is being conducted in each of towers 301, 303. While a first tower is serving as the cooling tower to cool the hot gases, the other tower is serving to heat the compressed air flowing therethrough via air feed line 321. In the next cycle, the roles of the respective towers 301, 303 are reversed. Likewise with towers 361, 363. While one of these towers is serving as the component separation tower to separate the less volatile gas components by sublimation or condensation from the cooled gases flowing from towers 301, 303, the other tower serves to reheat the more volatile, noncondensed or clean components of the gas passing out of the component separation tower. In the next cycle, the roles of the respective towers 361, 363 are reversed.

Thus in a first cycle one of the towers 301, 303 is selected as the cooling tower into which the hot particle free exhaust gases are ducted and the corresponding valve 305a is opened. If tower 301 is to serve as the cooling tower, valve 305a associated therewith and valve 305b associated with tower 303 are opened while valve 305b associated with tower 301 and valve 305a associated with tower 303 remain closed. The hot exhaust gases flow from feeder conduit 153 through valve 305a into tower 301 in which the gases are cooled prior to compression in compressor 313. At the same time the tower 301 is heated by the hot gases in preparation for serving as the air heating tower in the next cycle. The compressed gases are then directed by conduit 309 to feed conduit 353 for component separation in towers 361 or 363. When tower 361 is to serve as the component separation tower valve 364a associated therewith and valve 364b associated with tower 363 are opened while valve 364b associated with tower 361 and valve 364b associated with tower 363 remain closed. The relatively cooled compressed exhaust gases flow from feed conduit 353 through valve 364a into tower 361 in which the gaseous components are further cooled and separated by sublimation or condensation with the less volatile components remaining in tower 361 while the more volatile or purified components pass through the tower. (It is assumed here that towers 301 and 361 had already been precooled in a previous cycle so that the gases will be cooled in tower 301 and less volatile gas components loaded into tower 361 will be sublimed or "frozen out".) At the same time the tower 361 is heated by the relatively cool exhaust gases in preparation for serving as the purified gas reheating tower in the next cycle. The gas, freed of the less volatile components, flows via valve 365a and transfer conduit 373 through turbine 375 wherein the gas is further cooled. The exhaust gases are allowed to flow through towers 301 and 303 in this manner for a short period of time, for example, for about 6 to 10 minutes. Energy extracted from the gases by turbine 375 is used to drive the generator 376. The gases expand in the turbine and are cooled as they expand. The expansion pressure ratio in the turbine need only be sufficient to accomplish the desired cooling. In view of this additional pressure drop, a system which utilizes an expansion turbine will generally operate at a somewhat higher combustion system pressure as compared to a system which utilizes some other means of cooling the exhaust gas, such as a conventional heat exchanger.

The further cooled purified gases are returned through tower 363 via transfer conduit 374 and valve 365c. In tower 363 the purified gases are reheated to the relatively cool condition while the tower is cooled (it is assumed that tower 363 had been pre-heated in a previous cycle by passage of relatively cool exhaust gases therethrough). The relatively cool purified gases leave tower 363 through tower connection conduit 367 and valve 364b and are discharged via purified off gas discharge conduit 172. If the off gas contains sufficient thermal energy values, as will hereinafter be discussed, then its thermal content may be reclaimed. If the off gas contains insufficient thermal energy it is generally vented to ambient.

It will be appreciated that in the immediately previous cycle, tower 361 had been used for the sublimation or "freezing out" step" and the less volatile components of the gas had been condensed or converted into the solid phase and had remained within tower 361, i.e., the tower was loaded. Therefore, in the next cycle, loaded tower 361 is cleaned by revaporizing the "frozen out", sublimed or condensed components from the prior cycle to form an acid gas. In one embodiment of the invention, the initial flow of purified gas which passes through loaded tower 361 may be used to purge the tower. The mixed flow of purified gas and revaporized components, i.e., acid gas, as shown in FIG. 1, are ducted through compressor 182 via purified gas discharge conduit 172 and valve 169a into the blowdown conduit 193a. The acid gas typically consists mainly of $SO_2$ and $CO_2$ with small amounts of $SO_3$ and other noxious gases. Inasmuch as exhaust gas discharge restrictions preclude emission of three gases, most noxious components in the blow-down gases are neutralized by scrubbing or are otherwise separated out to permit exhausting the cleansed blowdown gas. Cleaning of the loaded tower in this manner can be accomplished during each cycle by switching the initial purified gas flow to the blowdown line 193a via valve 169a for just enough time to purge the tower and then switching the purified gas flow back through valve 169b to either be vented via gas path 193b, valve 183a, line 195 and vent line 194 or, if the purified off gas contains sufficient thermal energy to be used as a thermal source for heating water or other heat exchange medium, utilized via heat exchanger 196, as will be discussed more fully hereinafter. In another embodiment of the invention, loaded tower 361 may be cleaned using vacuum revaporization system 330, shown in phantom in FIG. 1, alone or in combination with the purified gas purge flow into the blowdown conduit as previously described. To use vacuum revaporization system 330, at the beginning of each cycle, just before exhaust gas flow is switched from tower 301 to tower 303 (or vice versa), the valves are realigned to allow flow into the new hot exhaust gas receiving tower and the tower to be cleaned of sublimed or condensed components is isolated and momentarily (up to about 5 seconds) connected to the vacuum revaporization system to substantially instantaneously equalize pressure therebetween and to substantially completely revaporize the sublimed or condensed components. In the instance, for example, where hot exhaust gas flow is switched to tower 303 and compressed air flow is initiated through tower 301, valve 305a associated with tower 303 and valve 305b associated with tower 301 are opened as are valves 364a and 365a associated with tower 363 and valves 364b and 365c associated with tower 361. At the same time valve 305a associated with tower 301, valve 305b associated with tower 303, valves 364a and 365a associated with tower 361 and valves 364b and 365c associated with tower 363 are closed to complete the realignment of the system valves. Valve 365c associated with tower 361 is closed to momentarily (up to about 5 seconds) isolate tower 361, which contains the sublimed or condensed components from the previous cycle, from turbine 375. Vacuum revaporization system 330 is connected to tower 361 via valve 364b and purified gas discharge conduit 172 by opening valve 332 in vacuum line 331 which opens a flow path between tower 361, vacuum chamber 334 and compressor 340. Vacuum pump 336 operates to reduce the pressure in chamber 334 by a ratio of about 10 to 1. When chamber 334 is connected to tower 361 the pressure in tower 361 instantaneously drops to equalize with the reduced pressure in chamber 334 and the "frozen out", sublimed or condensed components in tower 361 are revaporized to form an acid gas which is drawn out of tower 361. The withdrawn acid gas is compressed by compressor 340 and is discharged into acid gas discharge conduit 338 from which it may be directed, in the same manner as is gas in blowdown conduit 193a, to scrubbing or other noxious component separation apparatus.

The heat energy stored in tower 303 is recovered by passing compressed air through air feed line 321 and compressor 322 into and through tower 303 in which the air is heated while the solid packing in tower 303 is cooled (it is assumed that tower 303 had been preheated in a previous cycle by passage of hot exhaust gases therethrough). The heated air leaves tower 303 by way of tower connection conduit 307 through valve 305b and conduit 170 and may be utilized, such as by expanding through helper turbine 22 to produce useful shaft work, by ducting the air to serve as the preheated combustion air fed to chamber 14 via preheated air line 26 and flow control valve 28 therein, as shown in FIG. 1, and/or for other purposes, as will be more fully discussed hereinafter. It is the flow of cool compressed air through tower 303 which readies that tower for the next cycle during which gas cooling will take place therein.

As can be seen most clearly in FIG. 1, the helper turbine exhaust air in conduit 171 can be diverted through optional air supply line 320 (shown in phantom) to serve as an air feed source for line 321. Alternatively, the helper turbine exhaust air can be diverted through one or more optional expansion turbines 130 (shown in phantom) to generate additional shaft work or electrical energy via optional power generator 132 (shown in phantom). The further expanded and cooled air exiting turbine 130 is generally discharged to ambient, but could be reused if desired. In still another alternative or additional use, the helper turbine exhaust air may be used as a thermal energy source in a heat exchanger to directly heat water or other heat exchange fluid in heat reclamation unit 100. For example, heat reclamation unit 100 may comprise an optional heat exchanger 185 into which cold water is fed via feed line 184 by pump 192. The water is heated by closing valve 190b and directing the helper turbine exhaust air via line 171a into heat exchanger 185 through valve 190a and heating coils or sparger 186. The cooled air is vented from heat exchanger 185 through vent line 191. Heated water is pumped from heat exchanger 185 through line 187 by pump 188 to be used for district heating, and the like. In another embodiment shown in FIG. 3, heat reclamation unit 100 may be used to directly heat water or other heat exchange fluid. For example, optional heat exchangers 444, 445 may be provided into which cold water is fed via feed line 447. The water is initially heated at ambient pressure almost to its vaporization point by direct heat exchange in heat exchanger 445 and the thus heated water is pumped from heat exchanger 445 via line 487 and pump 488 into heat exchanger 444. Heat exchanger 444 is maintained at an elevated temperature and pressure for further heating and degassing of the water prior to utilization, for example as feed water to the economizer section of a steam generator or to a district heating system, or for conversion of the water into steam. The helper turbine exhaust air is fed initially through heat exchanger 444 by closing valve 190b and directing the exhaust air via line 171a into the heat exchanger via valve 190a and line 489. From heat exchanger 444 the exhaust air is directed into heat exchanger 445 via line 448 and sparger 446. Cooled air is vented as necessary from heat exchanger 445.

Figure 4:
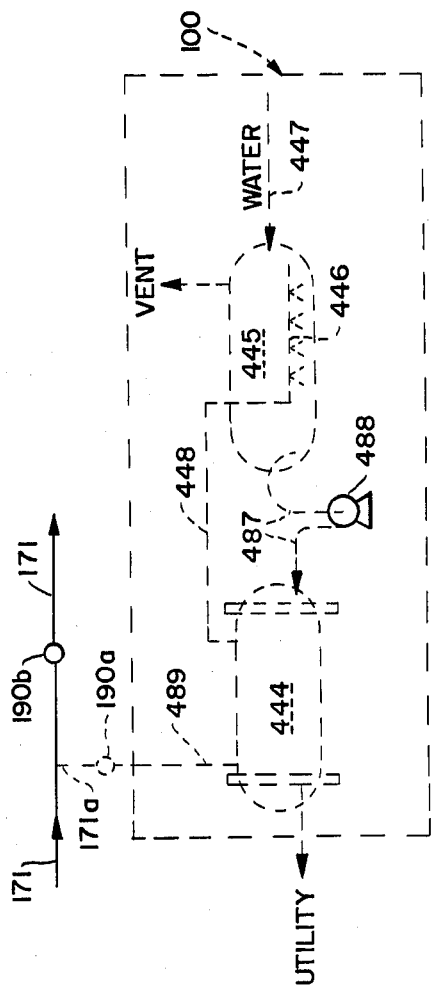
FIG. 4 is a schematic flow diagram of an illustrative helper turbine exhaust gas heat reclamation unit for use in the FIG. 1 embodiment of the present invention.

It will, of course, be appreciated that the thermal values of the helper turbine exhaust air can be used to heat a recyclable, preferably water immiscible, intermediate heat exchange fluid, which can then be used to heat water or other medium. Such an embodiment is shown in FIG. 4 wherein heat reclamation unit 100 comprises optional heat exchangers 544 and 545 for exchanging heat between the recyclable heat exchange fluid and the helper turbine exhaust air, turbine 543 and power generator 542 for extracting useful mechanical work from the heat exchange fluid and converting it to electrical energy and a condenser 541 for condensing the turbine exhaust heat exchange fluid and returning it to heat exchanger 545. To aid in better understanding the embodiment of FIG. 4 the flow of helper turbine exhaust air through heat reclamation unit 100 is shown as dashed lines and the flow of recyclable heat exchange fluid is shown as dot-dash lines. By closing valve 190b, conduit 171a directs the helper turbine exhaust air via valve 190a and line 589 into, through and out of heat exchanger 544, and, then, into heat exchanger 545 via line 548 and sparger 546. Cooled air is vented as necessary from heat exchanger 545. Liquid recyclable heat exchange fluid fed via line 539 is initially heated almost to its vaporization point by direct heat exchange with helper turbine exhaust air in heat exchanger 545 (which may comprise an injection drum in which a power fluid is sprayed into direct contact with the helper turbine air) and the thus heated heat exchange fluid is pumped from heat exchanger 545 via line 587 and pump 588 into heat exchanger 544. In heat exchanger 544 the heat exchange fluid is vaporized by heat exchange with helper turbine exhaust air and the vapors are ducted through conduit 537 to an expansion turbine 543 in which the vapor expands and cools. The work done by the vapors on the turbine is manifested as turbine shaft energy. Coupled to the output shaft of turbine 543 is a power generator 542. The cooled exhaust vapor exiting the turbine 543 is carried via duct 538 into condenser 541 where a flow of a heat exchange cooling medium, such as water, through coils 540 causes the recyclable heat exchange fluid to condense. The condensed heat exchange fluid is returned to heat exchanger 545 through return conduit 539 and the cycle is repeated.

In a typical system such as shown in FIG. 2 the hot gases entering the cooling tower 301 are at a temperature of about 400°–600° C. and are cooled in the tower to about 40°–130° C. (relatively cool condition) at which temperature the gases are compressed and passed to tower 361 in which they are cooled to about $-100°$ to $-140°$ C., the temperature at which component separation occurs. The purified gases leaving tower 361, which may be further cooled in turbine 375, are reheated in tower 363 to within 5° to 10° C. of the temperature of the gases entering tower 361 prior to discharge through line 172 for heat reclamation, venting, etc. If the purified gases leaving tower 361 are in the range of 40° C. to less than about 70° C., then the purified off gas will not contain sufficient heat values to be useful and will likely have to be vented. On the other hand, if the gases are in the range of 70° C. to 130° C., then the purified off gas generally contains sufficient residual heat for use, such as the heat source in a heat exchanger. The compressed air entering tower 303 via air feed line 321 may be heated in tower 303 to within 5° to 10° C. of the temperature of the gases entering tower 301. If for some reason it is not desired to reclaim the bulk of the heat energy of the towers with a heat transfer fluid such as compressed air, then provision can be made for directing the purified gases through heat energy-containing tower 303 wherein the gases are reheated. The heat energy would then have to be reclaimed from the heated purified gas exiting the system through conduit 170, e.g., as is described in connection with copending application Ser. No. 962,103, filed Nov. 17, 1978.

Thus it can be seen that the system of the present invention offers a choice in the manner of reclaiming the heat energy of the exhaust gases. Heat energy may be reclaimed by thermal exchange between the compressed air flow passed through the tower and the relatively hot tower solids. Alternatively or concurrently, heat energy may be reclaimed from the relatively cooled purified off gases exiting the system through discharge conduit 172 if they have been reheated sufficiently to achieve a temperature range at which the heat values of the gases may usefully and efficiently be reclaimed. If it is not desired to reclaim heat energy via the purified off gas, the purified off gas flow may be vented. On the other hand, heat energy may usefully be reclaimed if the off gas is at a temperature in the range from about 70° C. to 130° C. Thus, as shown in FIG. 1, the purified off gas may be ducted through valve 169b, line 193b and valve 183b into heat exchanger 196 where the gas gives up its heat energy in coils or sparger 179 before being vented from the heat exchanger via vent line 194 as cooled off gas. In this case it is desirable to retain as much heat energy as possible in the pufified off gas. Thus, compressor 182 may be operated without the conventional after cooler in order that the heat energy added to the exhaust gas by the compressor is retained in the system and ultimately reclaimed from the purified off gas. Cold water, for example, may be fed to heat exchanger 196 via line 177 and pump 178 to absorb the heat energy from the off gas and heated water pumped from heat exchanger 196 via line 180 and pump 181. It will, of course, be appreciated that the heating values of the off gas can be used to heat other liquids, air or other gases or may be used to heat a recyclable, preferably water immiscible, intermediate heat exchange fluid which can then be recycled or used to heat water, air or other medium. The balance of the heat energy in towers 301, 303, i.e., the portion not absorbed by the purified gas, is removed directly from the heated tower solids using a heat transfer fluid, e.g., compressed air, other than the purified gases. The heated fluid exiting the towers via line 170 may be utilized in the manners previously described herein.

The next cycle is like the one just described except that tower 303 serves as the exhaust gas cooling tower and tower 301 as the air heating tower. It will be appreciated that following the previous cycle, tower 301 was left in a relatively heated state by the passage of hot exhaust gases therethrough whereas tower 303 was left in a relatively cooled state by virtue of having given up its heat content to the compressed air passing therethrough. Just before the hot exhaust gas flow from feeder conduit 153 is directed through valve 305a into tower 303, but after valves 305a, 305b, 364a, 364b, 365a and 365c have been realigned to allow gas flow, sequentially, through towers 303, 363 and 361 and compressed air flow through tower 301, valve 365c associated with tower 361 is momentarily closed (up to 5 seconds) to isolate tower 361 in communication with the previously described vacuum revaporization system for substantially completely cleaning loaded tower 361 of sublimed or condensed components. Then valve 365c associated with tower 361 is reopened and hot exhaust gas flow is directed through valve 305a into tower 303 in which the gases are cooled while the tower is heated. They are then ducted via cross conduit 315 to compressor 313 in which they are compressed. The compressed gases are ducted through conduit 309 to feed conduit 353 for component separation in tower 363 prior to further cooling in turbine. It will be appreciated that following the previous cycle, tower 361 was left in a relatively heated state by the passage of the relatively cooled exhaust gases therethrough whereas tower 363 was left in a cooled state by virtue of having given up its heat content to the cold purified gases passing therethrough. The relatively cooled exhaust gases flow from feed conduit 353 through valve 364a into tower 363 in which the gaseous components are further cooled and separated by sublimation of condensation while the tower 363 is heated. Following processing in tower 363 the purified gases are ducted through turbine 375, wherein they are still further cooled, to tower 361 wherein they are reheated to the relatively cool condition, while the tower is cooled and purged of any remaining "frozen out", sublimed or condensed components from the prior cycle. The purified or mixed gases are then discharged from the system via purified off gas discharge conduit 172 for further processing of revaporized components, venting, heat reclamation, and the like. At the same time, the thermal energy stored in tower 301 is reclaimed by passing compressed air from air feed line 321 therethrough. Heated air leaving tower 303 flows via conduit 170 to and through helper turbine 22 to produce shaft work, via preheated air line 26 to chamber 14 as preheated combustion air and/or is used for other purposes. It will be appreciated that as the heated air source switches between towers 301 and 303 there is a momentary interruption in motivating air flow to helper turbine 22. In order to prevent instability and to reduce the shock as flow falls off then resumes then falls off again, a flywheel is provided, in conventional manner, on helper turbine 22.

The use of regenerators for the purpose of cooling the primary turbine exhaust gas prior to purification and reclaiming the heat energy of the exhaust gas prior to discharge adds to the overall thermodynamic efficiency of the gas turbine power plant system by utilizing heat exchange equipment which operates at thermal efficiencies in the 90% range while it simplifies the design and reduces capital costs. Capital costs can be further reduced by utilizing a gas separation and heat reclamation unit 158 which employs only two towers, each necessarily serving a dual function. Each tower is effectively a split regenerator wherein separate upper and lower portions perform separate functions. Thus, while a first tower is being cooled in an upper portion thereof by a flow of relatively cool compressed air and in a lower portion thereof by the flow of cold purified off gas, initial cooling of the hot exhaust gas is taking place in an upper portion of the second tower and component separation by sublimation or condensation is taking place in a lower portion of the second tower. Condensed or sublimed components are removed from the lower portion of the second tower at the beginning of the next cycle by the initial flow of purified gas therethrough.

With minor modification the system of FIG. 1 is equally useful for heat reclamation from a hot clean exhaust gas, see FIG. 5, such as a gas resulting from combustion of a clean fuel such as $CH_3OH$ or clean natural gas, which contain no harmful contaminants. Such a gas would not require purification and could pass from the gas turbine 12 to a heat reclamation unit, 158, there being no need for a gas separation function. Therefore, regenerator towers 459, 463 could serve exclusively as highly efficient heat transfer units for the reclamation of thermal energy from the hot exhaust gas.

In the operation of the embodiment illustrated in FIG. 5 the clean, hot, substantially ambient pressure primary turbine exhaust gases from turbine 12 pass via gas feeder conduit 153 into one of towers 459, 463 wherein the hot gases give up heat to the high heat capacitance solids therein and become cooled, preferably to about ambient temperature. At the same time, the thermal energy content of the other tower 459, 463 (it having been heated by the passage of hot exhaust gases therethrough in a previous cycle) is recovered by passage of a heat exchange fluid, e.g., compressed air, therethrough. A first step of one cycle is carried out by opening the valves 464a, 465a at each end of tower 459 and valves 464c, 465c at each end of tower 463. The hot exhaust gases will then flow from feeder conduit 153 via valve 464a through tower 459 in which the gases cool. The cooled gases exit tower 459 via valve 465a and off gas discharge line 172. As shown and discussed in connection with FIG. 1 the cooled off gas may either be vented or utilized to reclaim heat values therefrom.

It will, likewise, be appreciated that as the exhaust gases cool in passing through tower 459, the tower solids are heated. The heat stored in the tower solids may be recovered by feeding a cool heat exchange fluid, such as ambient temperature compressed air, from air feed line 321 and compressor 322 into tower 463 (it is assumed here that the tower 463 had been preheated in a previous cycle by the flow of hot exhaust gases therethrough). The flow of air cools the solid packing in tower 463 as it passes therethrough and becomes heated itself as it does so. It is the flow of cool compressed air through tower 463 that readies the tower for the next cycle during which exhaust gas cooling will take place therein. The heated air may be used to operate one or more helper gas turbines as already described herein or a portion may be used as preheated combustion air. The helper turbine exhaust air may be used to operate a power turbine or as the thermal energy source in a heat exchanger, as shown and discussed in connection with FIGS. 1, 3 and 4, to directly heat water, air or other heat exchange fluid.

While the invention has been described with reference to particular embodiments thereof it will be understood that numerous modifications may be made by those skilled in the art without actually departing from the scope of the invention. For example, the methods and systems illustrated in FIGS. 1–5 are effective to reduce the impurity levels in the purified gas to trace levels. Should it be desired to completely remove all sulfurous compounds and other harmful components, adsorption or absorption systems can be linked, in known manner, to the systems of FIGS. 1–5. Accordingly all modifications and equivalents may be resorted to which fall within the scope of the invention as claimed.

I claim:

1. A process of treating hot gas for increasing the thermal efficiency of a gas turbine power producing system motivated thereby comprising the steps of:
    (a) expanding a hot gas containing environmentally harmful components through a first gas turbine means to produce shaft work;
    (b) passing the first turbine means exhaust gas through a heat exchange zone in direct heat exchange relationship with a relatively high heat capacitance solid material to concurrently cool said gas and heat said solid material;
    (c) separating the harmful, less volatile components of said cooled gas from the more volatile components;
    (d) discharging the more volatile components of the cooled gas;
    (e) recovering at least a portion of the thermal energy of said exhaust gas by passing a first heat transfer fluid other than said exhaust gas in direct heat exchange relationship with said heated solid material to concurrently cool said solid material and heat said first fluid, whereby said heated first heat transfer fluid is gaseous; and
    (f) expanding said gaseous first heat transfer fluid through a second gas turbine means to produce shaft work.

2. A process, as claimed in claim 1, wherein said first heat transfer fluid is compressed air.

3. A process, as claimed in claim 2, wherein said hot gas is a hot combustion gas produced in a fuel-air combustion zone, and at least a portion of said heated first heat transfer fluid is directed to said combustion zone as the combustion air source therefor.

4. A process as claimed in claims 1 or 2, wherein said heat exchange zone comprises first and second heat exchange sub-zones arranged in parallel relationship and said exhaust gas is passed, alternately, through said first and second sub-zones, said thermal energy from said first sub-zone being recovered by said first heat transfer fluid while said gas is passed through said second sub-zone.

5. A process, as claimed in claims 1 or 2, wherein the second turbine means exhaust gas is passed in heat transfer relationship with a second heat transfer fluid to concurrently heat said second fluid and cool said second turbine means exhaust gas.

6. A process, as claimed in claims 1 or 2, wherein at least a portion of the thermal energy of said exhaust gas is recovered by passing said more volatile components of said cooled gas in direct heat exchange relationship with at least a portion of said solid material in said heat exchange zone to heat said more volatile components of said cooled gas.

7. A process, as claimed in claim 6, wherein said heated more volatile components of said cooled gas are passed in heat transfer relationship with a third heat transfer fluid to concurrently heat said third fluid and cool said more volatile components of said cooled gas.

8. A process as claimed in claims 1 or 2, wherein said exhaust gas is cooled by passage through at least two heat exchange zones arranged in series.

9. A process, as claimed in claim 8, wherein at least a portion of the thermal energy of said gas is recovered by passing said cooled gas in direct heat exchange relationship with said solid material in at least one of said heat exchange zones to heat said cooled gas.

10. A process, as claimed in claim 9, wherein said heated gas is passed in heat transfer relationship with a third heat transfer fluid to concurrently heat said third fluid and cool said gas.

11. A process, as claimed in claim 8, wherein each heat exchange zone comprises first and second heat exchange sub-zones arranged in parallel relationship.

12. A process, as claimed in claim 11, wherein there are first and second heat exchange zones, at least a portion of the thermal energy of said exhaust gas is recovered by passing said cooled gas from said separating step in direct heat exchange relationship with said solid material in said second sub-zone of said second heat exchange zone and a portion of the thermal energy of said gas is recovered by passing a first heat transfer fluid in direct heat exchange relationship with said solid material in said second sub-zone of said first heat exchange zone.

13. A process, as claimed in claim 12, wherein the second turbine means exhaust gas is passed in heat transfer relationship with a second heat transfer fluid to concurrently heat said second fluid and cool said second turbine means exhaust gas.

14. An apparatus for increasing the thermal efficiency of a gas turbine power producing system, comprising:
(a) first gas turbine means for expanding a hot gas containing environmentally harmful components to produce shaft work;
(b) first heat exchange means for passing hot first gas turbine means exhaust gas into direct heat exchange relationship with a relatively high heat capacitance solid material to exchange heat between said exhaust gas and said solid material and concurrently cool said gas and heat said solid material;
(c) means for separating said cooled gas into less volatile and more volatile components;
(d) discharge means for discharging the more volatile components of said gas to atmosphere;
(e) recovery means for recovering and processing the less volatile components of said gas to remove environmentally harmful components therefrom;
(f) second heat exchange means for passing a fluid into direct heat exchange relationship with a relatiely high heat capacitance solid material to exchange heat between said fluid and said solid material, whereby a heat transfer fluid is passed through said second heat exchange means to concurrently cool said solid material and heat said fluid and said heated fluid is gaseous; and
(g) second gas turbine means for expanding said gaseous heat transfer fluid to produce shaft work.

15. An apparatus, as claimed in claim 14, wherein said first and second heat exchange means are arranged in parallel relationship and including means for directing said hot exhaust gas and said heat transfer fluid, alternately, to said first and second heat exchange means whereby said hot gas is directed to said heat exchange means containing relatively cool solid material and said fluid is directed to said heat exchange means containing relatively hot solid material.

16. An apparatus, as claimed in claims 14 or 15, including third and fourth heat exchange means arranged in parallel relationship to each other, said third and fourth heat exchange means arranged in series relationship with said first and second heat exchange means such that flow through said heat exchange means passes, sequentially, through said first, third, fourth and second heat exchange means, each of said third and fourth heat exchange means comprising means for passing a gas into direct heat exchange relationship with a relatively high heat capacitance solid material, whereby said hot exhaust gas is passed sequentially through said first and third heat exchange means to concurrently cool said gas and heat said solid materials therein, said more volatile components of said gas are separated from said less volatile components in said third heat exchange means and passed through said fourth heat exchange means to concurrently reheat said more volatile components of said gas and cool said solid material therein and a heat transfer fluid is passed through said second heat exchange means to concurrently heat said fluid and cool said solid material therein.

17. An apparatus, as claimed in claim 16, further including purified gas heat reclamation means for recovering said reheated more volatile components of said gas and for recovering at least a portion of the thermal energy content thereof.

18. An apparatus as claimed in claim 16, wherein said first and third heat exchange means comprise a first regenerator tower, said fourth and second heat exchange means comprise a second regenerator tower, and said towers contain said relatively high heat capacitance solid material.

19. An apparatus, as claimed in claim 16, wherein each of said heat exchange means comprises a regenerator tower containing said relatively high heat capacitance solid material.

20. A process for increasing the thermal efficiency of a gas turbine power plant system, comprising the steps of:
(a) expanding a hot, clean gas through a first gas turbine means to produce shaft work;
(b) passing the first turbine means exhaust gas through a heat exchange zone in direct heat exchange relationship with a relatively high heat capacitance solid material to concurrently cool said exhaust gas and heat said solid material;
(c) recovering at least a portion of the thermal energy of said exhaust gas by passing a first heat transfer fluid other than said exhaust gas in direct heat exchange relationship with said heated solid material to concurrently cool said solid material and heat said first fluid, whereby said heated first heat transfer fluid is gaseous; and
(d) expanding said gaseous first heat transfer fluid through a second gas turbine means to produce shaft work.

21. A process, as claimed in claim 20, wherein the second turbine means exhaust gas is passed in heat transfer relationship with a second heat transfer fluid to concurrently heat said second fluid and cool said second turbine means exhaust gas.

22. An apparatus for improving the thermal efficiency of a gas turbine power producing system, comprising:
(a) first gas turbine means for expanding a hot, clean gas to produce shaft work;
(b) first heat exchange means for passing hot first gas turbine means exhaust gas into direct heat exchange relationship with a relatively high heat capacitance solid material to exchange heat between said exhaust gas and said solid material and concurrently cool said gas and heat said solid material;
(c) second heat exchange means for passing a fluid into direct heat exchange relationship with a relatively high heat capacitance solid material to exchange heat between said fluid and said solid material, whereby a heat transfer fluid is passed through said second heat exchange means to concurrently cool said solid material and heat said fluid and said heated fluid is gaseous; and
(d) second gas turbine means for expanding said gaseous heat transfer fluid to produce shaft work.

23. An apparatus, as claimed in claim 22, wherein said first and second heat exchange means are arranged in parallel relationship and including means for directing said hot exhaust gas and said heat transfer fluid, alternately, to said first and second heat exchange means whereby said hot gas is directed to said heat exchange means containing relatively cool solid material and said fluid is directed to said heat exchange means containing relatively hot solid material.

24. An apparatus, as claimed in claim 22, wherein each of said heat exchange means comprises a regenerator tower containing said relatively high heat capacitance solid material.

* * * * *